United States Patent

[11] 3,600,644

[72] Inventor Robert E. Eck
Costa Mesa, Calif.

[21] Appl. No. 804,891
[22] Filed Mar. 6, 1969
[45] Patented Aug. 17, 1971
[73] Assignee Ford Motor Company
Dearborn, Mich.

[54] SUPERCONDUCTOR-NORMAL METAL CIRCUIT ELEMENTS EXHIBITING JOSEPHSON EFFECTS
6 Claims, 6 Drawing Figs.

[52] U.S. Cl. .......... 317/234, 331/107, 307/306, 307/298, 307/277
[51] Int. Cl. .......... H01l 5/04, H01l 9/08
[50] Field of Search .......... 331/107 S; 317/234, 236; 307/298, 277, 245, 306

[56] References Cited

UNITED STATES PATENTS 3,423,607 1/1969 Kunzler et al. .......... 307/306

OTHER REFERENCES

N. Meyers, I.B.M. Technical Disclosure Bulletin, Vol. 4, No. 7, Dec. 1961, page 94 relied on.

Von Molnar, Applied Physics Letters, Vol. 11, No. 5, 1 Sept. 1967, pp. 163— 164 relied on.

*Primary Examiner*—John W. Huckert
*Assistant Examiner*—Martin H. Edlow
*Attorneys*—John R. Faulkner and Keith L. Zerschling

ABSTRACT: This disclosure relates to a low temperature circuit element exhibiting radio frequency or AC Josephson effects comprising a member constructed of metal capable of superconductivity at low temperatures and a second member constructed of a metal that is normal or nonsuperconductive. One of the members has a generally flat surface and the other has a tapered end either in the form of a point or a line positioned in contact with the flat surface.

The disclosure also relates to the method of constructing a low temperature circuit element which comprises taking a material exhibiting superconducting effects when cooled to a critical temperature and another material of the normal or nonsuperconductive type. A flat surface is formed on the one member, while a tapered end, either in the form of a point or knife edge, is formed on the other. The members are cooled to a temperature equal to or below the critical temperature of the superconductive material. The member having the tapered end is then moved into engagement with the flat surface in a direction generally perpendicular to the plane of the flat surface.

INVENTOR.
Robert E. Eck
BY John R. Faulkner
Keith L. Zerschling
ATTORNEYS

INVENTOR.
Robert E. Eck
BY John R. Faulkner
Keith L. Zerschling
ATTORNEYS.

SUPERCONDUCTOR-NORMAL METAL CIRCUIT ELEMENTS EXHIBITING JOSEPHSON EFFECTS

BACKGROUND OF THE INVENTION

There have been a number of circuit elements developed based on the AC Josephson effect. These devices may be used as oscillators, detectors or other circuit components. All of these devices comprise essentially weak links between two superconductive materials that have been cooled to superconducting temperatures. For example, a very thin insulating layer may be positioned between two superconducting metals, a point contact may be formed by tapering one of the metals into a point and contacting it on the other metal or certain carved or bridge structures may be employed in which a weak link comprised of a reduced cross section may be carved in a superconducting body. Until now it has been assumed that in order to obtain the AC Josephson effects, the two members separated by the weak link must be comprised of superconductive material. The applicant has constructed and successfully tested a circuit element exhibiting AC Josephson effects in which one of the members is constructed of a normal or nonsuperconducting metal. This has been accomplished by tapering one of the members to form either a pointed or knifelike edge that is a few microns in diameter or width when it is contacted with the other member. When a suitable current source is attached to these members to provide current flow through the weak link provided by the contact between the two members, AC Josephson effects are exhibited.

This circuit element may be constructed by etching a flat surface on one of the members and etching a tapered surface, either in the form of a point or a knife edge on the other member. The two members are cooled below the critical temperature of the superconductive metal of which one of the members is constructed. The two members are then brought in contact with one another by moving the member with the point or knife edge in a direction perpendicular to the flat surface of the other member and bringing the two members into contact under light pressure. All of the AC Josephson effects observed in previous structures constructed of all superconducting material have been observed. Thus, the present invention is eminently suited for use as a low temperature circuit element and may be used for detection or emission of electromagnetic radiation, measurement of voltage, frequency or other variables, or as a nonlinear circuit element.

SUMMARY OF THE INVENTION

The present invention relates to a low temperature circuit element that is capable of exhibiting AC Josephson effects. More particularly, it comprises two members, one of which is constructed of a metal capable of superconductivity, while the other member is constructed of normal or nonsuperconducting metal. One of these members is formed, preferably by etching, to provide a pointed end or a knife edge. The other member is formed, preferably by etching, to provide a substantially flat surface. The two members are then cooled to a temperature equal to or below the critical temperature of the member constructed of superconducting metal and the pointed end or knife edge is then brought into engagement under light pressure with the flat surface.

The AC Josephson effects may readily be observed by connecting a source of electrical energy, for example, a battery, in series with the two metal members, a variable resistor and an ammeter. A voltmeter is connected across the two members and the circuit element may be subjected to microwave radiation. As the current through the device is increased, a nonlinear relationship will be established with respect to the voltage across the two members, particularly the voltage across the weak link established at the contact between the two members that may be either a point or a line contact. If the contact is a point contact, it should be only a few microns in diameter; while if the contact is a line contact, the width of the surface formed should be only a few microns in dimension.

The circuit element formed may be used as an oscillator, detector, or other active circuit element and exhibits all of the AC Josephson effects previously known for devices constructed of two members of superconducting material. As will be explained subsequently, a wide variety of normal or nonsuperconductive materials may be employed thus aiding in the ease of construction and reducing cost.

DESCRIPTION OF THE PREFERRED EMBODIMENT

Figure 1:
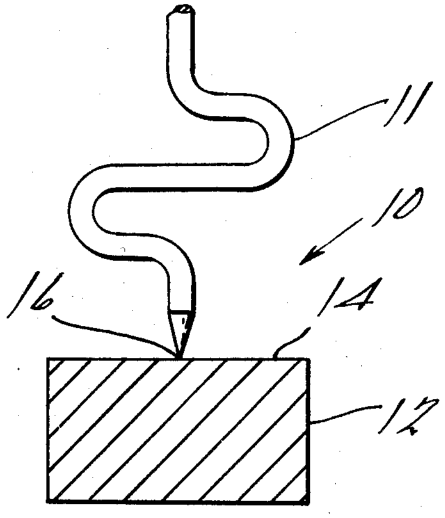
FIG. 1 is an end elevational view, partially in section, of a circuit element constructed in accordance with the principles of the invention.

Referring now to FIG. 1 there is shown one embodiment of a circuit element 10 of the present invention formed by a first metal member 11 and a second metal member 12. One of these members is constructed of a material capable of exhibiting superconducting effects when cooled to a critical temperature, while the other member is constructed of a normal or nonsuperconducting metal. A flat surface 14 is formed on the member 12, and this may be done by conventional etching techniques to form a crystal surface with a diameter or width of approximately one-fourth inch. A point 16 is formed on the member 11, preferably by conventional etching techniques, and this point may have a dimension which is a micron or two in diameter. The device is then cooled to a temperature equal to or below the critical or transition temperature of the member formed of the superconducting material. The member 11 is moved in a direction perpendicular to the surface 14 until the point 16 comes into engagement with this surface under light pressure.

Figure 2:
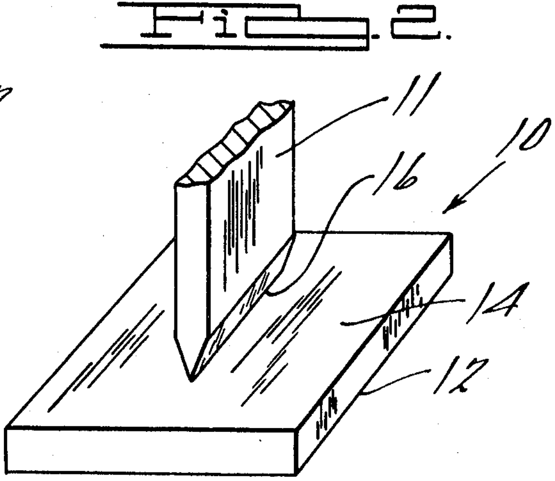
FIG. 2 is a perspective view of another circuit element constructed in accordance with the principles of the invention.

Another embodiment of a circuit element constructed in accordance with the principles of the invention is shown in FIG. 2. In this embodiment the member 11 is constructed to have a sharp knife edge 16 of very small width, i.e., several microns which comes into contact with the flat surface 14 after the circuit element has been cooled to a temperature equal to or below the critical temperature or transition temperature of the superconducting material of which one of the members is constructed. This knife edge would provide a contact with the flat surface 14 approximately 10 microns wide. Otherwise, the circuit element shown in FIG. 2 is the same as the circuit element shown in FIG. 1.

Devices or circuit elements as shown in FIG. 1 have been constructed in which the member 11 was made of niobium or tantalum and the member 12 was made of normal or ferromagnetic metals, for example, gold, silver, platinum, copper, nickel or iron. Similarly, devices or circuit elements as shown in FIG. 1 have been constructed in which the member 11 is constructed of normal or ferromagnetic material, for example, gold, silver, platinum, copper, nickel or iron; and the member 12 is constructed of a superconductive material, for example, niobium or tantalum. It is readily apparent that the same materials may be employed to construct the circuit element shown in FIG. 2. In fact, any superconducting material and any conductive material of a nonsuperconducting or normal type may be employed to form either of the two members 11 and 12 of the circuit elements 10 shown in FIGS. 1 and 2.

Figure 3:
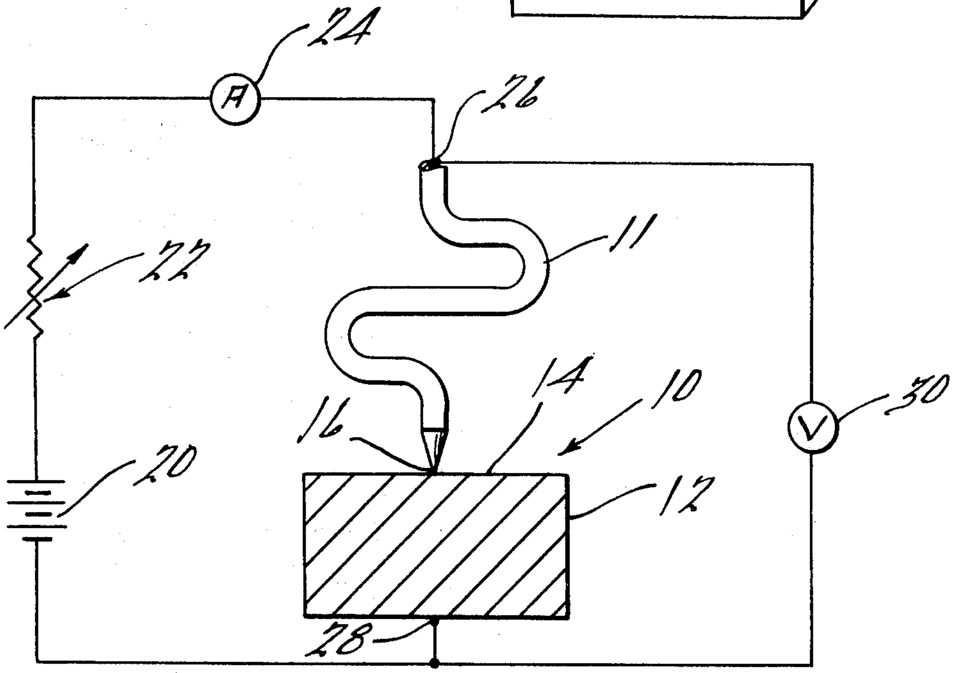
FIG. 3 is a circuit diagram of a circuit utilizing the circuit element of FIG. 1.

Referring now to FIG. 3 there is shown a circuit diagram of a circuit wired to operate the circuit elements shown in FIGS. 1 and 2 either as an oscillator or as a detector. In this circuit diagram the device of FIG. 1 is shown, but it is readily apparent that the device of FIG. 2 may be substituted therefor. In this circuit diagram a source of electrical energy 20, preferably in the form of a DC electrical storage battery, has one terminal connected in series with a variable resistor 22 and an ammeter 24. The ammeter is connected at 26 to the member 11. The other terminal of the source of electrical energy 20 is connected to the member 12 at 28. A voltmeter 30 is connected across the point or line contact and the two members 11 and 12 that form this contact by connecting one terminal at 26 to the member 11 and the other terminal at 28 to the member 12. The circuit element 10 is biased by means of the source of electrical energy to an appropriate level by means of the variable resistor 22. Current measurements may then be made by the ammeter 24 and voltage measurements across the element may be made by means of the voltmeter 30. Appropriate current and voltage relationships may be established to provide AC Josephson effects which include the creation of oscillating electrical energy through the circuit element and, more particularly, through the contact, either the point contact or the line contact, between the members 11 and 12. The frequency of this current or energy is proportional to the voltage across it.

Figure 4:
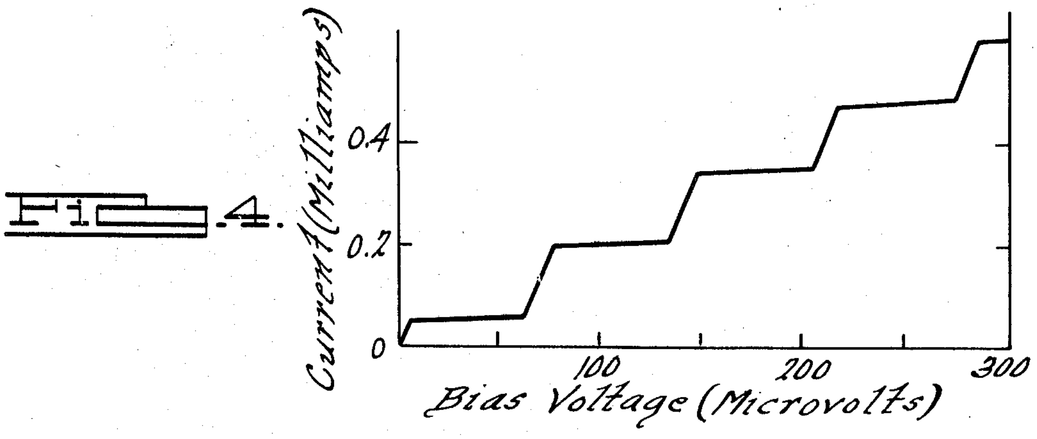
FIG. 4 is a plot showing the nonlinear characteristics between current through a circuit element of the present invention and voltage across it when it is subjected to microwave radiation.

The devices of FIGS. 1 and 2 exhibit current-voltage characteristics similar to that of entirely superconducting point contacts in which a discontinuous change in voltage is exhibited with respect to current. This characteristic is shown in FIG. 4 and was obtained by plotting the voltage read on voltmeter 30 against the current read on the ammeter 24 when the circuit element or device 10 was cooled to a temperature below the critical or transition temperature of the member constructed of superconducting material and was subjected to microwave radiation in a microwave cavity. It can readily be appreciated by those skilled in the art that this current-voltage characteristic is very similar to those of devices constructed of two superconducting materials coupled by a point contact and proves, as a result, that AC Josephson effects are exhibited by the circuit elements shown in FIGS. 1 and 2. The specific metals used in constructing the device that exhibited the particular current voltage characteristics shown in FIG. 4 were niobium for the member 11 and nickel for the member 12.

Figure 5:
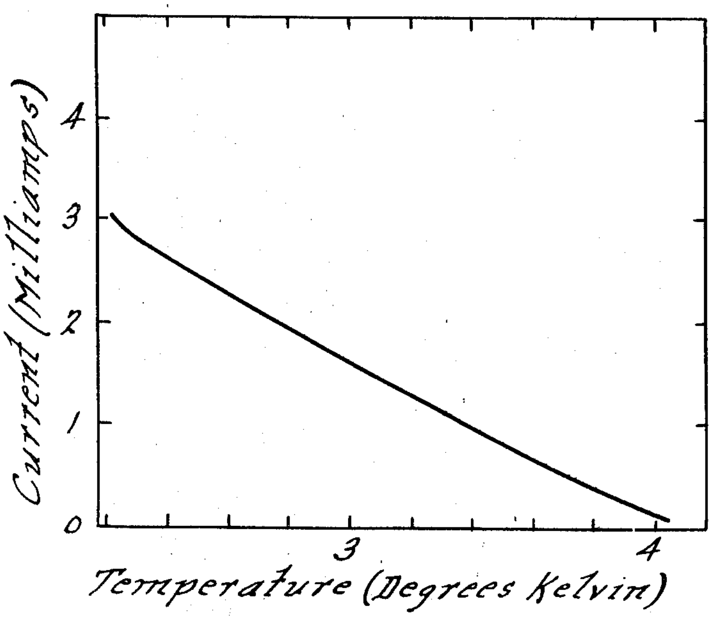
FIG. 5 is a plot of the current through a circuit element constructed in accordance with the principles of the invention against absolute temperature.
Figure 6:
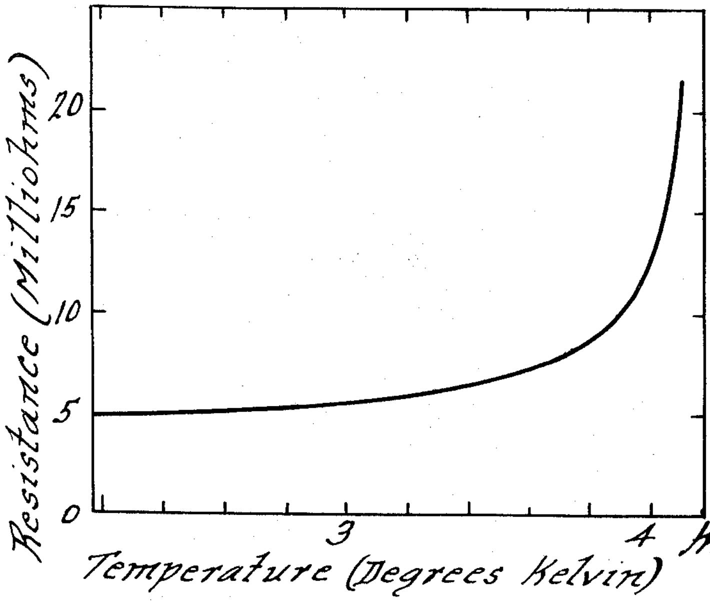
FIG. 6 is a plot of the resistance of a circuit element of the present invention against absolute temperature.

FIG. 5 shows the temperature dependence of the critical current through the contacts formed between the members 11 and 12 of the circuit element shown in FIG. 1; and FIG. 6 shows the temperature dependence of the resistance or the slope of the current-voltage characteristic of such a circuit element. These two curves are for a circuit element 10 in which the member 11 is constructed of tantalum and the member 12 of copper. The temperature dependence, it is believed, reflects the growth of the induced superconductivity near the surface of the normal metal, i.e., copper. The large change in the resistance shown, therefore, reflects growth of superconductivity into this copper. It can be readily appreciated that the transition temperature of the devices shown in FIGS. 1 and 2 is somewhat below the normal transition temperature for the superconducting member alone, i.e., tantalum since tantalum has a critical or transition temperature of 4.38° K.

In the circuit element shown in FIG. 1, the member 12 was constructed of a metal having a thickness of one-eighth to one-fourth inch, and the member 11 was constructed of a wire having a range of diameters from 0.005 inch to one-sixteenth inch. The point 16 was etched to a diameter of 1 to 2 microns and had a surface contact with the flat surface 14 on the member 12 of approximately 0.010 inch in diameter. Such a circuit element may exhibit oscillations due to the Josephson effect in the gigacycle range. For example, certain of the circuit elements exhibited oscillations of 35 gigacycles.

The present invention thus provides a low temperature circuit element exhibiting AC Josephson effects comprised of a weak link or small contact between a superconducting metal and a nonsuperconducting or normal metal when the circuit element is cooled to a temperature below the critical or transition temperature of the superconducting metal.

The invention disclosed will have many modifications which will be apparent to those skilled in the art in view of the teachings of this specification. It is intended that all modifications which fall within the true spirit and scope of this invention be included within the scope of the appended claims.

I claim:

1. A low temperature circuit exhibiting Josephson effects comprising a first metal member and a second metal member, one of said members being constructed of a material that is superconductive at cryogenic temperatures, the second member being constructed of a material that is normal or nonsuperconductive, one of said members having a flat surface and the other of said members having a tapered end positioned in contact with said flat surface to form a small area contact.

2. The combination of claim 1 in which the member having the tapered end is constructed of the material that is superconductive at cryogenic temperatures.

3. The combination of claim 2 in which said member having the tapered end is constructed of niobium and said other member is constructed of nickel.

4. The combination of claim 2 in which said member having the tapered end is constructed of tantalum and said other member is constructed of copper.

5. The combination of claim 1 in which the tapered end is formed in a point having a diameter of several microns when in contact with said flat surface.

6. The combination of claim 1 in which the tapered end is formed in a knife edge having a width of several microns when in contact with said flat surface.